(12) United States Patent
Peters et al.

(10) Patent No.: US 9,027,731 B2
(45) Date of Patent: May 12, 2015

(54) MEAT-PROCESSING SYSTEM

(75) Inventors: Erik Hendrikus Werner Peters,
Boxmeer (NL); Andries Johan Martijn Kuijpers, Westerbeek (NL); Wilbert Hiddink, Varsseveld (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 7 days.

(21) Appl. No.: 13/514,246

(22) PCT Filed: Dec. 17, 2010

(86) PCT No.: PCT/NL2010/050863
§ 371 (c)(1),
(2), (4) Date: Jun. 6, 2012

(87) PCT Pub. No.: WO2011/078664
PCT Pub. Date: Jun. 30, 2011

(65) Prior Publication Data
US 2012/0247920 A1 Oct. 4, 2012

(30) Foreign Application Priority Data
Dec. 23, 2009 (NL) .................................... 2004008

(51) Int. Cl.
*B65G 47/252* (2006.01)
*A22C 21/00* (2006.01)
(Continued)

(52) U.S. Cl.
CPC ......... *A22C 21/0053* (2013.01); *A22C 17/0093* (2013.01); *B65G 47/248* (2013.01); *B65G 47/71* (2013.01)

(58) Field of Classification Search
CPC .. B65G 47/244; B65G 47/248; B65G 47/252; A22C 21/0053
USPC ........... 198/402, 403, 405, 407, 411; 452/182
See application file for complete search history.

(56) References Cited

U.S. PATENT DOCUMENTS 3,726,388 A * 4/1973 Petrovas et al. ............... 198/405
4,958,409 A * 9/1990 Braeger et al. ................ 452/178
(Continued)

FOREIGN PATENT DOCUMENTS

CA 2002652 A1 5/1990
DE 1454072 10/1969
(Continued)

OTHER PUBLICATIONS

Notice of Reasons for Rejection dated Aug. 4, 2014 issued in Japanese Patent Application No. JP2012-545881, in English language.

*Primary Examiner* — Gene Crawford
*Assistant Examiner* — Thomas Randazzo
(74) *Attorney, Agent, or Firm* — Birch, Stewart, Kolasch & Birch, LLP

(57) ABSTRACT

A meat-processing system includes a production station for producing meat products, a processing station for processing the meat products, and a conveying system configured for conveying the meat products in a conveying direction along a conveying path from the production station to the processing station. The conveying system includes a supply conveyor and a discharge conveyor. The supply conveyor is configured for transferring the meat products to the discharge conveyor in such a manner that the discharge orientation with which the meat products are delivered by the production station differs from the orientation with which the meat products are supplied to the processing station.

18 Claims, 7 Drawing Sheets

(51) Int. Cl.
  *A22C 17/00* (2006.01)
  *B65G 47/248* (2006.01)
  *B65G 47/71* (2006.01)

(56) References Cited

U.S. PATENT DOCUMENTS

| | | | | |
|---|---|---|---|---|
| 5,101,716 | A * | 4/1992 | Cones et al. | 99/450.5 |
| 5,398,801 | A * | 3/1995 | Langen et al. | 198/407 |
| 7,434,677 | B2 * | 10/2008 | Ritchie et al. | 198/407 |
| 8,056,700 | B2 * | 11/2011 | Malek et al. | 198/403 |
| 8,272,498 | B2 * | 9/2012 | Ponti | 198/405 |
| 8,348,144 | B2 * | 1/2013 | Thorsson et al. | 235/375 |
| 2005/0014460 | A1 | 1/2005 | van Esbroeck et al. | |
| 2009/0215369 | A1 * | 8/2009 | Busch | 452/149 |
| 2009/0260951 | A1 | 10/2009 | Groenewald et al. | |
| 2010/0028121 | A1 * | 2/2010 | Lalesse et al. | 414/802 |
| 2012/0028557 | A1 * | 2/2012 | Bro | 452/157 |

FOREIGN PATENT DOCUMENTS

| | | |
|---|---|---|
| JP | S60-117327 U | 8/1985 |
| JP | H02-238845 A | 11/1988 |
| JP | 63-283536 A | 11/1998 |
| JP | 2000-142962 A | 5/2000 |
| JP | 2002-534069 A | 10/2002 |
| NL | 8901470 A | 1/1991 |
| NL | 1030671 | 6/2007 |
| WO | WO 00/40094 A1 | 7/2000 |

* cited by examiner

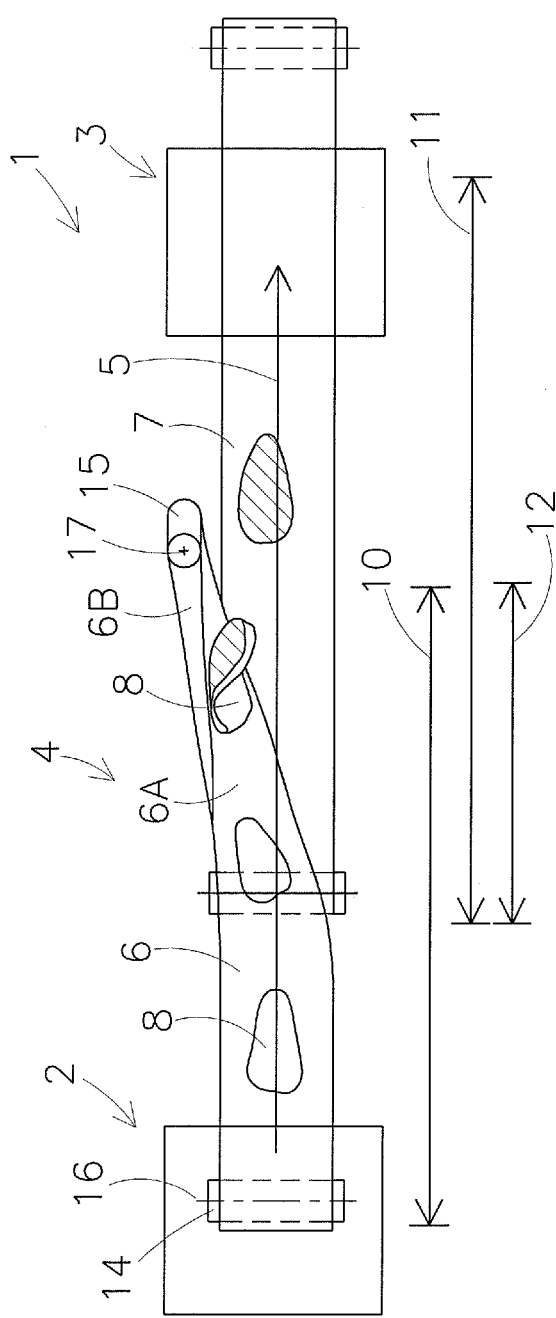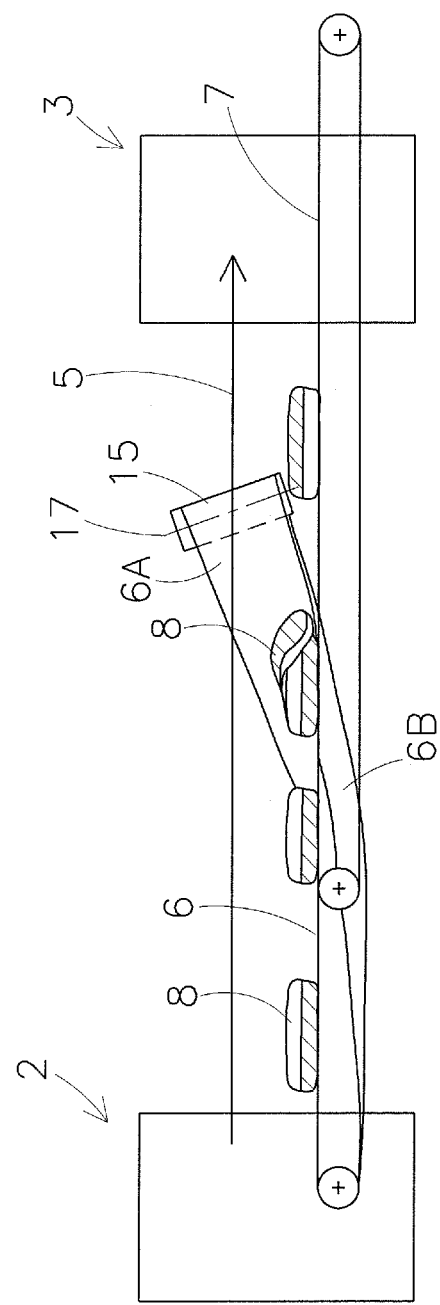

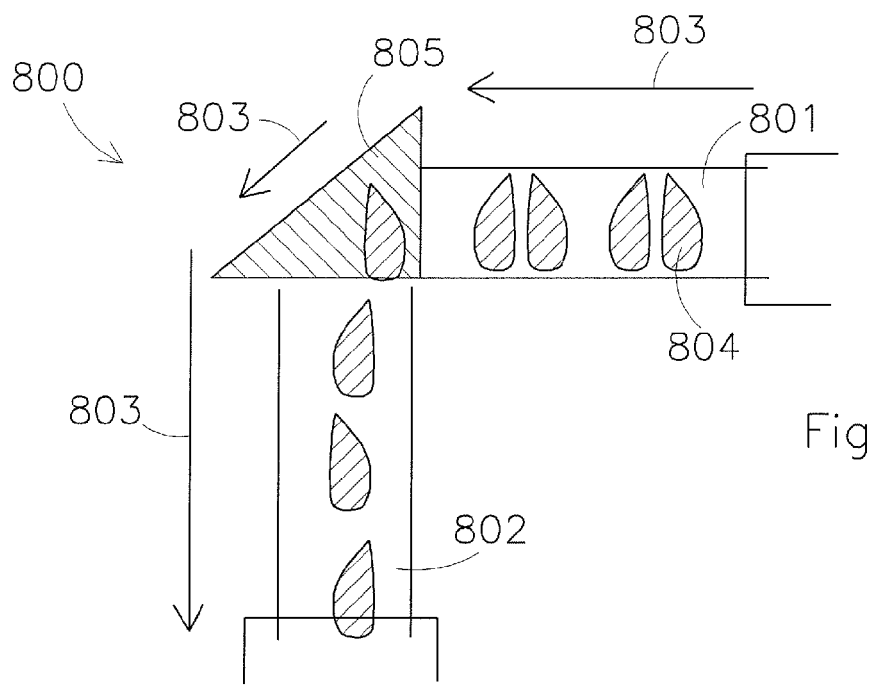
Fig 8
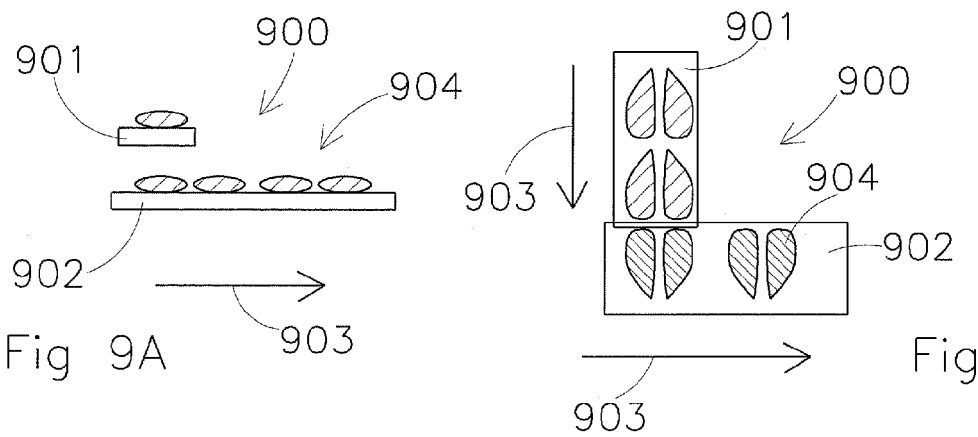
Fig 9A          Fig 9B
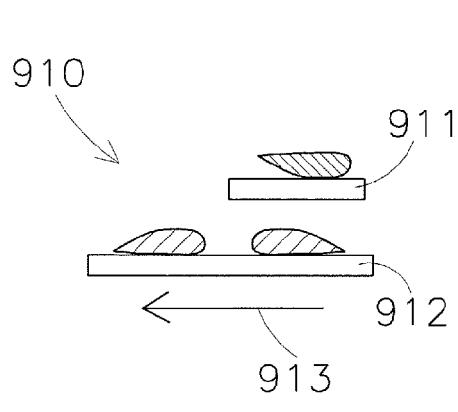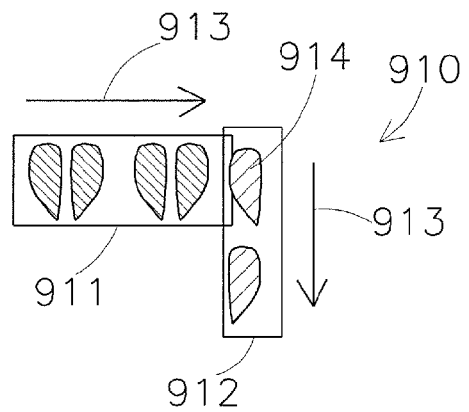
Fig 10A          Fig 10B

MEAT-PROCESSING SYSTEM

The invention relates to a meat-processing system comprising a production station, a processing station and a conveying system for conveying meat products from the production station to the processing station.

Meat-processing systems of this type are known from the prior art. In the meat-processing industry, production lines are used in which the meat products are conveyed from production stations, for example a station for harvesting breast fillets of chickens, to a processing station, for example for weighing and/or sorting breast fillets, by means of conveying systems, in particular conveyor belts.

A problem associated with the current meat-processing systems is the fact that production stations and processing stations are not always joined to one another in an optimum manner. For example, a production station may be configured to produce a stream of meat products on a conveyor belt, with the meat products lying on the conveyor belt with a cut surface turned downwards on the conveyor belt. A subsequent processing station is configured to visually inspect the cut surface. However, in order to be able to do this, the meat products have to be on the conveyor belt with the cut surface turned upwards. It may also be the case, for example, that a production station generates two streams of meat products while the processing station can only process a single stream of meat products.

In practice, such compatibility problems are often solved by including an additional processing station in the production line. In such a processing station, the meat products are manually taken from a supply conveyor and laid on a discharge conveyor in the correct position. Meat products from several supply conveyors are also manually transferred to a single discharge conveyor or vice versa. Such known solutions are undesirable as the use of manpower entails high costs and the risk of errors occurring during processing is relatively high.

It is an object of the invention to provide an improved meat-processing system which, at least partly, solves the problem with regard to the orientation of meat products, preferably of slaughter pieces of poultry such as chickens, preferably of breast fillets. In particular, the invention is aimed at providing a meat-processing system comprising a conveying system which makes it possible to join a production station configured to produce meat products with a certain orientation to a processing station which is configured to process a stream of meat products with an orientation which differs from the orientation of the meat products which are delivered by the production station.

To this end, the invention provides a meat-processing system according to claim 1. Such a system comprises a production station, a processing station and a conveying system configured to convey meat products in a conveying direction along a conveying path from the production station to the processing station. The conveying path has a supply part and a downstream discharge part. The supply part comprises a supply conveyor and the discharge part a discharge conveyor.

The conveying system comprises at least one supply conveyor for conveying the meat products along a supply section of the conveying path and at least one discharge conveyor for conveying the meat products along a discharge section of the conveying path. The supply conveyor supplies meat products with a supply orientation determined by the production station with respect to the conveying direction. The supply conveyor is configured to transfer the meat products to the discharge conveyor and the conveying system, preferably the discharge conveyor of the conveying system, and is configured in such a way that the discharge orientation, that is to say the orientation of the meat products with respect to the conveying direction on the discharge conveyor, differs from the supply orientation, that is to say the orientation of the meat products with respect to the conveying direction on the supply conveyor.

The conveying system is thus configured to change the orientation of a stream of meat products during conveying. In this way, the orientation with which the meat products are supplied by the production station is modified to match the orientation with which the meat products are processed in the processing station.

Processing of breast fillets of slaughtered poultry, for example chicken, comprises for example packaging the breast fillet in a packaging tray (and optionally sealing the tray), cutting the breast fillet into strips or cubes, scanning the breast fillet for, for example, bone splinters and/or contusions, weighing the breast fillet, picking the breast fillet up by means of a robot arm and placing it in a packaging tray, marinating the breast fillet, etc. In order to make processing by the processing station possible, in many cases the breast fillet has to be supplied to the processing station with a certain orientation. Breast fillets are for example packaged with the outer side facing upwards, so that the latter is visible through the transparent sealing film of the packaging tray. The colour and texture of the outer side of the breast fillet which is turned to the skin before slaughtering is relatively uniform, compared to the inner side of the breast fillet which is turned to the breast before slaughtering. The outer side of the breast fillet is thus more attractive to the consumer than the inner side of the breast fillet.

For the scanning of the breast fillets for bone splinters and contusions, it is desirable that the inner side of the breast fillets is turned upwards. For weighing, it is desirable that the breast fillets are supplied individually. For the cutting of the breast fillet, it is desirable that the breast fillet is supplied to the processing station with a leading wide side.

The production stations supply the breast fillets with a certain orientation. This orientation does not always correspond to the desired orientation of the breast fillet for processing in the next processing station. The invention makes it possible to assemble a meat-processing system comprising a production station and a processing station, in which the production station supplies the meat products with a different orientation than the orientation with which the meat products are processed by the processing station.

A meat-processing system according to the invention therefore does not require an additional processing station in which the orientation of the stream of meat products is manually adjusted. A meat-processing system according to the invention thus processes meat products in an efficient manner, that is to say at low costs and with a small risk of processing errors.

Preferably, a meat-processing system according to the invention comprises a supply conveyor which is configured to change the orientation of the meat products supplied by this supply conveyor by turning the meat products over in such a manner that the side of the meat product which is turned downwards on the supply conveyor is turned upwards on the discharge conveyor. Such a system is particularly suitable for turning over, for example, breast fillets of slaughter birds. Breast fillets have an inner side which lies against the skeleton of the animal, and an outer side which is turned towards the skin of the animal. Once the breast fillets have been detached, which is also referred to by the specialist term "harvested", from the bird skeleton, the inner side has to be checked for bone splinters and contusions. For this operation, it is desirable for the inner side of the breast fillet to be turned upwards, so that visual inspection of the inner surface of the breast fillet is possible. In many cases, the breast fillet is subsequently packaged with the skin side, which is more attractive to the consumer, facing upwards. It is therefore necessary to turn the breast fillet over at least once during the process. Due to the elongate, flexible shape of the breast fillet and the slightly sticky surface, this is a task which is difficult to perform manually in a quick and accurate manner. A meat-processing system according to the invention is particularly suitable for producing, inspecting, turning and processing breast fillets at high speed.

Preferably, the supply conveyor is configured such that the surface of the supply conveyor in the downstream direction gradually tilts transversely to the conveying direction, from a substantially horizontal position, for supporting a meat product to a substantially vertical position for transferring the meat product to the discharge conveyor in a lateral direction, in such a manner that the breast fillet tilts about an axis parallel to the conveying direction.

In a first embodiment, the supply conveyor extends substantially in line with the discharge conveyor and slightly overlaps the discharge conveyor. The tilted end of the supply conveyor extends next to the discharge conveyor. Such an embodiment is particularly suitable when the space for placing the conveying system is limited in the width direction. As the supply conveyor overlaps the discharge conveyor, and the part of the supply conveyor which extends next to the discharge conveyor extends substantially in the vertical direction, the assembly is particularly narrow. A small footprint is particularly advantageous in, for example, slaughterhouses where work is carried out in conditioned, for example cooled, spaces, with a limited square footage.

In an alternative embodiment, the supply conveyor does not overlap the discharge conveyor, but the supply conveyor extends partly next to the discharge conveyor. The surface of the supply conveyor gradually tilts transversely to the conveying direction at the end of the supply part of the conveying path, from a substantially horizontal position for supporting a meat product to a tilted, substantially vertical position for transferring the meat product to the discharge conveyor in a direction substantially transverse to the conveying direction. As, in this embodiment, the supply conveyor does not overlap the discharge conveyor, products can be placed on the supply conveyor upstream of the point where the products are transferred from the supply conveyor to the discharge conveyor. Such an embodiment is thus particularly suitable for combining two product streams into one product stream.

The invention thus provides a meat-processing system comprising a simple conveying system for connecting a production station to a processing station.

The conveying system makes it possible to adjust the discharge orientation of a production station during the conveying process from the production station to the processing station to the input orientation of a processing station. Thus, no separate processing station is required in which the orientation is adjusted, for example manually. The conveying system is simple and can therefore be produced and maintained at low cost.

In a further preferred embodiment, a meat-processing system according to the invention is provided with a production station configured for substantially simultaneously producing a first and a second stream of meat products, and a processing station for processing a single stream of meat products.

The meat-processing system furthermore preferably comprises a conveying system provided with a first supply conveyor according to one of the abovementioned exemplary embodiments and at least one second supply conveyor according to the last-mentioned example.

In a preferred embodiment, the two supply conveyors transfer the meat products to a common discharge conveyor. The common discharge conveyor extends in a discharge direction for conveying the meat products supplied by the supply conveyors along a discharge section of the conveying path. The number of meat products discharged per unit time by the discharge belt differs from the number of meat products supplied per unit time by a single supply belt. The discharge frequency of the discharge belt is equal to the combined supply frequencies of the two supply belts.

Such a meat-processing system is particularly suitable for changing the orientation of the meat products, preferably by tilting the meat products about an axis parallel to the conveying direction, and combining a first and a second stream of meat products into a single stream of meat products. The conveying system can be assembled in a simple manner from conveyor belts of relatively simple construction, as a result of which the production costs of such a system are low.

In a further preferred embodiment, the invention provides a meat-processing system comprising a production station for harvesting breast fillets of slaughtered poultry, in which the production station is configured for substantially simultaneously producing a first stream of left-hand breast fillets and a second stream of right-hand breast fillets.

The meat-processing system comprises a processing station for processing a single stream of both left-hand and right-hand breast fillets. The meat-processing system furthermore comprises a conveying system configured for conveying the breast fillets in a conveying direction along a conveying path of the production station to the processing station. To this end, the conveying system comprises a first and a second supply conveyor, and a common discharge conveyor.

The first supply conveyor extends in a supply direction for conveying the left-hand breast fillets along a first supply section of the conveying path at a supply frequency and supply orientation with respect to the conveying direction which are determined by the production station.

The second supply conveyor extends in a supply direction for conveying the right-hand breast fillets along a second supply section of the conveying path at a supply frequency and supply orientation with respect to the conveying direction which are determined by the production station.

The common discharge conveyor extends in a discharge direction for conveying the breast fillets supplied by the supply conveyors along a discharge section of the conveying path.

The first and second supply conveyors are configured for transferring the breast fillets to the common discharge conveyor in a first and a second transfer location, respectively, in which case the second transfer location is located downstream of the first transfer location. The breast fillets are transferred to the discharge conveyor in a lateral direction with respect to the conveying direction.

Preferably, at least one supply conveyor of the meat-processing system is configured such that the transport surface in the downstream direction gradually tilts transversely to the conveying direction from a tilted, substantially horizontal position for supporting a breast fillet to a substantially vertical position for transferring the breast fillet. The breast fillet is in this case transferred to the discharge conveyor in a direction substantially transverse to the conveying direction. As a result of the angle which the transport surface of the supply conveyor makes with respect to the conveying surface of the discharge conveyor, which extends substantially in the horizontal direction, the breast fillet tilts during transfer about an axis which extends substantially in the conveying direction. In this case, the meat product tilts at an angle of substantially 180 degrees, so that the side of the meat product which is turned downwards on the supply conveyor is turned upwards on the discharge conveyor.

Providing the supply conveyor with a transport surface which gradually tilts in the conveying direction makes it possible to tilt the breast fillets in a simple and efficient manner during transportation.

The discharge conveyor delivers the breast fillets to the processing station with a discharge orientation which differs from the supply orientation on a supply conveyor and a discharge frequency which differs from the supply frequency of a supply conveyor.

According to the invention, a meat-processing system provided with a production station configured for substantially simultaneously producing a first and a second stream of breast fillets is preferably provided with a splitter conveyor belt for separating the harvested breast fillets into a first stream of left-hand breast fillets and a second stream of right-hand breast fillets. The splitter conveyor belt comprises a left-hand conveyor belt and a right-hand conveyor belt, both of which extend from a collecting area where the breast fillets fall from the harvesting machine to a transfer area where the breast fillets from the left-hand and right-hand conveyor belt are transferred to the first and the second supply conveyor of the conveying system, respectively. In the collecting area, the sides of the left-hand and right-hand conveyor belt facing one another are placed against one another in such a manner that little or no space remains between the conveyor belts for collecting left-hand and right-hand breast fillets which slightly overlap one another. The left-hand and right-hand conveyor belts diverge from one another downstream of the collecting area, with the left-hand conveyor belt carrying along the left-hand breast fillet and the right-hand conveyor belt carrying along the right-hand breast fillet, in such a manner that overlapping breast fillets are separated from one another.

Preferably, the conveying system of a meat-processing system according to the invention is of a modular design so that the stations and the conveying system can be replaced independently of one another in order to combine a certain type of production station with different processing stations and vice versa. For example, as the supply conveyors and the discharge conveyors are separate components, they can be combined in different configurations. A single discharge conveyor may for example be combined with one or with two supply conveyors, depending on the production station which is used.

A conveying system according to the invention comprises a conveying path for conveying the meat products in a conveying direction. The conveying path extends between a production station and a processing station and has a supply part and a subsequent discharge part. The supply part comprises a supply conveyor and the discharge part comprises a discharge conveyor. The supply conveyor transfers the meat products to the discharge conveyor in such a manner that the orientation of the meat products with respect to the conveying direction is altered.

It is possible for an operation to be carried out on the meat products along the supply part of the conveying path. Thus, a processing station may for example be provided along the supply part in order to inspect the meat products visually by means of human eyes or a camera during transportation on a conveyor belt for discolouration, in which case the discoloured meat products are removed from the conveyor belt by a human or a robot, respectively. Only the non-discoloured meat products are subsequently transferred to the discharge conveyor by the supply conveyor.

Further advantageous embodiments of the invention are indicated in the subclaims.

The invention will be explained in more detail with reference to exemplary embodiments which are illustrated in the drawing, in which:

FIG. 1 shows a top view of a first meat-processing system according to the invention;

FIG. 2 shows a side view of the meat-processing system from FIG. 1;

FIG. 8 shows a top view of an alternative conveying system for a meat-processing system according to the invention;

FIG. 9a shows a front view of a further alternative conveying system for a meat-processing system according to the invention;

FIG. 9b shows a top view of the conveying system from FIG. 9a;

FIG. 10a shows a front view of a further alternative conveying system for a meat-processing system according to the invention;

FIG. 10b shows a top view of the conveying system from FIG. 10a;

Figure 3:
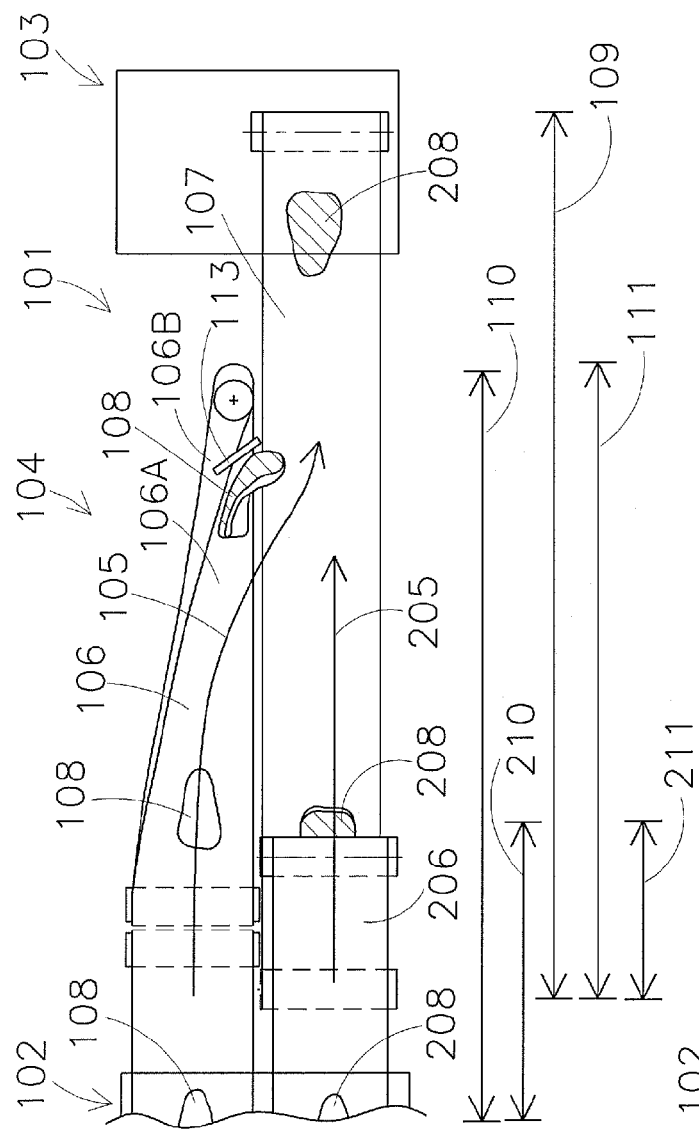
FIG. 3 shows a top view of a second meat-processing system according to the invention.

FIG. 1 shows a top view of a first exemplary embodiment of a meat-processing system 1 according to the invention. FIG. 2 shows a side view of the same exemplary embodiment. The meat-processing system 1 comprises a production station 2 for producing meat products 8 and a processing station 3 for processing the meat products 8. Furthermore, the meat-processing system comprises a conveying system 4 configured for conveying the meat products 8 in a conveying direction 5 along a conveying path from the production station 2 to the processing station 3.

The conveying system 4 comprises a supply conveyor 6 which extends in a supply direction in order to convey the meat products 8 along a supply section 10 of the conveying path at a supply frequency and supply orientation with respect to the conveying direction 5, and in particular with respect to a transport surface of the supply conveyor 6, which are determined by the production station 2.

The conveying system 4 furthermore comprises a discharge conveyor 7 which extends in a discharge direction in order to convey the meat products 8 along a discharge section 11 of the conveying path at a discharge orientation with respect to the conveying direction 5 which is determined by the conveying system 4.

The conveying path of the meat-processing station 4 thus extends from the production station 2 as far as inside the processing station 3, and is divided into the supply section, indicated by double arrow 10, and the discharge section, indicated by double arrow 11.

The supply conveyor 6 is configured for conveying the meat products 8 from the production station 2 along the supply section 10 of the conveying path. At the end of the supply section 10 of the conveying path, the supply conveyor 6 transfers the meat products 8 to the discharge conveyor 7.

The discharge conveyor 7 is configured for receiving the meat products 8 supplied by the supply conveyor 6 and for conveying meat products 8 along the discharge section of the conveying path. The transport surface of the discharge conveyor extends substantially in a horizontal plane in order to collect the meat product and cause it to tilt.

In the illustrated preferred embodiment, the supply conveyor and the discharge conveyor form part of the production station and the processing station, respectively. This has the advantage that the entire system can be of compact design, and the length of the conveying path between the production station and the processing station can be kept compact.

In the illustrated exemplary embodiment, the supply conveyor 6 starts in the production station 2 and the discharge conveyor ends beyond the processing station 3. In an alternative embodiment, the supply conveyor starts before the production station, and/or the discharge conveyor ends in the processing station.

In a further alternative embodiment, the supply conveyor and/or the discharge conveyor do not form part of the production station and the processing station, respectively. The supply conveyor then starts beyond the production station and receives the meat products from a supply device, such as a conveyor belt, of the production station. The discharge conveyor then ends before the processing station and transfers the meat products to, for example, a second conveyor belt which forms part of the processing station.

The supply section 10 and the discharge section 11 of the conveying path end and start, respectively, in a transfer location, indicated by double arrow 12. The transfer location 12 is the area in which a meat product 8 is transferred from the supply conveyor 6 to the discharge conveyor 7. As the conveyor belts overlap, the supply part 10 and the discharge part 11 of the conveying path also overlap.

The supply conveyor 6 is configured for transferring the meat products 8 to the discharge conveyor in such a manner that the discharge orientation differs from the supply orientation. In the illustrated exemplary embodiment, the supply conveyor 6 is configured so as to change the orientation of the meat products 8 supplied by said supply conveyor 6 by turning over the meat products about a horizontal axis which extends parallel to the conveying direction 5. The meat products are in this case turned over in such a manner that the side of the meat product which was turned downwards on the supply conveyor 6 is turned upwards on the discharge conveyor 7.

In order to clearly illustrate the tilting of the meat products 8, the meat products 8 in the figure are provided with a contrasting top and bottom side. On the supply conveyor 6, the meat products are placed with the hatched side on the transport surface of the conveyor belt. On the discharge conveyor 7, the turned-over meat products 8 are positioned with the hatched side facing upwards.

In the illustrated exemplary embodiment, the supply conveyor 6 actually overlaps the discharge conveyor 7. The supply conveyor 6 extends substantially in line with the discharge conveyor 7. The part of the supply conveyor 6 which overlaps the discharge conveyor 7, seen in top view, makes a slight curve, as a result of which the supply direction of the supply conveyor 6 is at an angle to the discharge direction of the discharge conveyor 7.

The part of the supply conveyor 6 which overlaps the discharge conveyor 7 forms a connection between that part of the supply conveyor 6 which extends in line with the discharge conveyor 7 and a downstream part of the supply conveyor 6 which extends next to the discharge conveyor 7. The part of the supply conveyor 6 which extends downstream of the curve extends next to the discharge conveyor. Here, the supply conveyor 6 is tilted with respect to the part of the supply conveyor which overlaps the discharge conveyor 7.

The supply conveyor is turned over on a return roller 14 with a rotation shaft 17 which extends in a substantially vertical direction. The conveyor belt subsequently returns to a return roller 14 at the start of the first part 10 of the conveying path. The rotation shaft of this return roller extends in a horizontal direction. The part of the supply conveyor which extends between the return rollers and moves in the supply direction during transportation is denoted in the figure by 6A. The part of the supply conveyor which moves in the direction opposite to the supply direction is denoted by 6B in the figure.

As has been mentioned earlier, the production station 2 produces meat products 8. The meat products 8 fall from the production station onto the supply conveyor 6 and are transported over the supply part 10 of the conveying path by the conveyor belt. At the end of the supply part 10 of the conveying path, the conveyor belt makes a curve, in which case the discharge conveyor 7 emerges from under the supply conveyor 6. The meat product 8 is carried along by the supply conveyor 6 and the transport surface gradually tilts transversely to the conveying direction. As a result thereof, the grip of the meat product on the transport surface gradually diminishes. At a certain point, the grip of the meat product on the conveyor belt is so slight that the meat product slides laterally in the direction of the discharge conveyor. The meat product lands on the transport surface of the discharge conveyor on its side and therefore tilts about an axis which extends substantially in a direction parallel to the conveying direction. The meat product 8 is thus turned over and at the same time transferred to the discharge conveyor 7. The discharge conveyor 7 subsequently carries the turned-over meat product 8 in the discharge direction to the processing station 3. In the processing station 3, the side of the meat product 8 which is turned upwards is subsequently inspected, for example, for the presence of bone splinters, for example by means of a scanner.

Such a meat-processing system can be used, for example, in order to combine a production station which delivers breast fillets in a position with the inner side turned upwards with a packaging station in which the breast fillets are packaged with the opposite skin side, which is more attractive for the consumer, turned upwards.

An advantage of the above-described supply conveyor which extends substantially in line with the discharge conveyor and overlaps the latter at the end is that the configuration using two conveyor belts in line with one another makes a very narrow arrangement possible.

Figure 4:
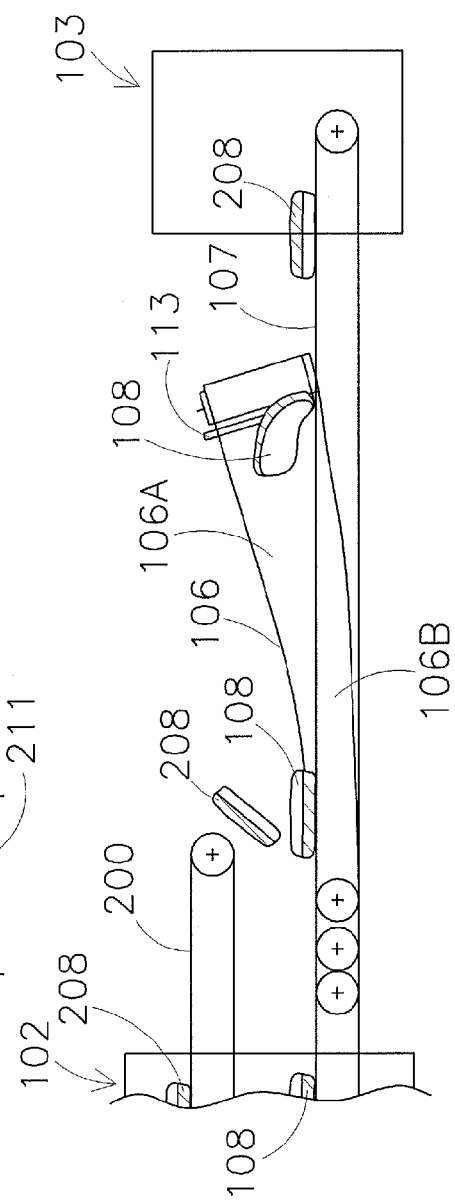
FIG. 4 shows a side view of the meat-processing system from FIG. 3.

FIG. 3 shows a top view of an alternative meat-processing system 101 according to the invention in which the at least one supply conveyor 106 is also configured for changing the orientation of the meat products 108 supplied by said supply conveyor by turning over the meat products about a horizontal axis which extends substantially parallel to the conveying direction 105. FIG. 4 shows a side view of the same exemplary embodiment.

The meat-processing system is provided with a production station 102, a processing station 103 and a conveying system 104 for conveying meat products 108 from the production station 102 to a processing station 103. In contrast with the meat-processing system illustrated in FIGS. 1 and 2, the production station illustrated in FIGS. 3 and 4 is configured so as to produce a first and a second stream of meat products substantially simultaneously.

The meat-processing system, in particular the conveying system, is therefore provided with a first supply conveyor 106 and a second supply conveyor 206. Both supply conveyors extend in a conveying direction 105, 205, for conveying the first stream of meat products and the second stream of meat products, respectively, along a supply section of the conveying path 110, 210. The meat products are transported at a supply frequency and with a supply orientation with respect to the conveying direction and with respect to a transport surface of the respective supply conveyors 106, 206 which are determined by the production station 102.

The two conveyors transfer the meat products to a common discharge conveyor 107 which extends in a discharge direction for conveying the meat products 108, 208 supplied by the supply conveyors 106, 206 along a discharge section 109 of the conveying path with an orientation which is determined by the conveying system. The discharge orientation of a meat product on the discharge conveyor differs from the supply orientation on a supply conveyor. Likewise, the discharge frequency of the discharge conveyor differs from the supply frequency of a supply conveyor. The discharge frequency of the discharge conveyor is equal to the combined supply frequencies of the supply conveyors.

The supply conveyors supply the products at a supply speed V1 and the discharge conveyor discharges the products at a discharge speed V2 which is at least twice the supply speed V1. This makes it possible for the discharge conveyor to discharge the meat products supplied in two streams in a single stream. Combining two or more streams of meat products is advantageous, for example, when the processing station is a weighing station for weighing individual meat products.

A weighing station generally has a high capacity, but can only weigh products individually. A weighing station can thus only process a single stream of meat products. By combining two supply streams to form a single discharge stream, the meat products can be weighed in a single weighing station and it is not necessary to provide two weighing stations next to one another.

It will be clear that, according to this solution, several of the supply conveyors disclosed in this description can be combined with one another in order to transfer two product streams to a common discharge conveyor which discharges the meat products in a single stream of meat products.

In this case, it is also possible for the supply speed of the supply conveyors to be equal to the discharge speed of the common discharge conveyor. In such an embodiment, the supply frequency of the supply conveyors is such that a meat product is passed to the discharge conveyor at certain intervals. During said interval, the other supply conveyor then passes a meat product to the discharge conveyor, etc. Determining the supply and discharge speeds and the mutual distance between the meat products in order to adapt the supply and discharge frequencies of the conveyor belts to one another in such a manner that two or more product streams can be combined to form a single product stream is assumed to be within the capabilities of a person skilled in the art.

The two supply conveyors illustrated in FIGS. 3 and 4 are discussed in more detail below.

The first supply conveyor 106 extends at the end of the supply section 110 of the conveying path along the discharge conveyor 107. The end of the supply part of the conveying path thus overlaps the start of the discharge part of the conveying path. This transfer area is indicated by the double arrow 111.

At the end of the supply section of the conveying path, the surface of the supply conveyor 106 gradually tilts transversely to the conveying direction. The surface tilts from a substantially horizontal position for supporting a meat product 108 to a tilted position for transferring the meat product 108 to the discharge conveyor 107, which tilted position is substantially vertical in the illustrated preferred embodiment, in a direction substantially transverse to the conveying direction 105. During the transfer from the supply conveyor 106 to the discharge conveyor 107, the meat product 108 tilts about an axis substantially parallel to the conveying direction 105.

In order to completely tilt the meat product, the transport surface of the supply conveyor tilts with respect to the transport surface of the discharge conveyor in such a manner that the meat product lands on its side on the supply conveyor upon transfer, then topples over in the direction of the discharge conveyor and thus tilts about an axis parallel to the conveying direction.

Preferably, the coefficient of friction between the surface of the supply conveyor and the meat product is such that the meat product only slides off the supply conveyor when the transport surface has tilted significantly with respect to the transport surface of the discharge conveyor. The kinetic energy resulting from the meat product sliding down assists in tilting the meat product when it comes into contact with the discharge conveyor.

Tests have shown that with certain meat products such as breast fillets from poultry such as chicken and turkey, this effect can be achieved by means of conveyor belts provided with a relatively smooth surface.

In the illustrated exemplary embodiment, the first supply conveyor is provided with an optional scraper 113. The purpose of the scraper is to loosen meat products which do not come off the supply conveyor in time and slide in the direction of the discharge conveyor from the supply conveyor in such a manner that they still slide in the direction of the discharge conveyor. The scraper extends across the surface of the supply conveyor, in such a manner that a meat product which remains "stuck" to the supply conveyor is moved over the scraper. The scraper detaches the meat product from the supply conveyor, as a result of which the meat product is transferred to the discharge conveyor.

The part of the supply conveyor which extends between the return rollers and moves in the supply direction during transportation is denoted in the figure by 106A. The part of the supply conveyor which moves in the opposite direction to the supply direction is denoted in the figure by 106B.

The above-described exemplary embodiment of a supply conveyor which extends parallel to the discharge conveyor has the advantage that this principle can be applied on both sides of a discharge belt. The solution can therefore be applied in a flexible manner and for example be used to add a first and a second supply stream to a common discharge conveyor on the right-hand side and the left-hand side.

The second supply conveyor 206 is also configured to change the orientation of the meat products supplied by this supply conveyor by turning over the meat products in such a manner that the side of the meat product which was turned downwards on the supply conveyor is turned upwards on the discharge conveyor. However, contrary to the above-described solutions, the meat products are tilted about a horizontal axis which extends transversely to the conveying direction.

At the end of the supply section 210 of the conveying path, the transport surface of the supply conveyor 206 extends in such a manner that the supply conveying direction is in line with the discharge conveying direction at the start of the discharge part of the conveying path. The transport surface of the supply conveyor 206 is positioned at such a height above the transport surface of said discharge conveyor 107 that a supplied meat product 208 rotates about an axis transverse to the conveying direction when it falls from the supply conveying belt to the discharge conveying belt. In such an arrangement, the leading and trailing parts of the meat product therefore also change.

The advantage of this supply conveyor is that a simple conveyor belt can be used which has return rollers at its ends which extend parallel to one another. Such conveyor belts are simple to produce and therefore inexpensive. In addition, the positioning of the supply conveyor in line with the discharge conveyor makes a compact arrangement possible.

On the basis of the description given above, it will be clear to the person skilled in the art that the disclosed supply conveyors can be used in different combinations and configurations. Thus, it is for example possible to use the supply conveyors illustrated in FIGS. 3 and 4 separately with a discharge conveyor, identical to the meat-processing system shown in FIGS. 1 and 2.

It is also possible, for example, to combine the supply conveyor illustrated in FIGS. 1 and 2 with the meat-processing system shown in FIGS. 3 and 4. Such a system then combines three supply conveyors with a common discharge conveyor. In such a system, the third supply conveyor can deliver the meat products at a location downstream of the transfer locations of the first and second supply conveyors. Preferably, the supply speed of the three supply conveyors is equal and the discharge speed of the discharge conveyor is substantially three times faster than the supply speed.

Such a combination has the advantage that three product streams can be combined to form a single product stream and that the arrangement is very compact. In this way, a processing station for weighing a single stream of meat products can, for example, be used in combination with a production station which simultaneously produces three streams of meat products, or for example with a first production station which produces two product streams and a second production station which produces a single product stream.

A further configuration of the conveying system is illustrated in FIGS. 8-13.

FIG. 8 shows a conveying system 800 comprising a supply conveyor 801, a discharge conveyor 802, and a transfer conveyor belt 805. The conveying system 800, in particular the transfer conveyor belt 805, is configured to transfer the meat products 804 from the supply conveyor 801 to the discharge conveyor 802 in such a manner that the discharge orientation differs from the supply orientation with respect to the conveying direction. The conveying direction is indicated by arrows 803.

The transfer conveyor belt 805 is provided with a transport surface, preferably formed by driven rolls, for supporting meat products and for conveying said meat products in a conveying direction. The beginning and the end of the transport surface of the transfer conveyor belt 805 are at an angle of forty-five degrees to the conveying direction 803. As is shown in FIG. 8, the meat products are thus transported on the transfer conveyor belt in a conveying direction 803 which is at an angle of forty-five degrees to the conveying direction 803 on the supply conveyor 801, and is at an angle of forty-five degrees to the conveying direction 803 on discharge conveyor 802. As a result of this configuration of the transfer conveyor belt, the meat products are rotated through an angle of 90 degrees about a vertical axis by the conveying system, i.e. an axis at right angles to the transport surface. In the illustrated example, the meat products 804 on the supply conveyor 801 extend transversely to the conveying direction, and the meat products 804 on the discharge conveyor 802 extend parallel to the conveying direction. A transfer conveyor belt with a beginning and an end at an angle to the conveying direction of the meat products on said transfer conveyor belt makes it possible to produce a conveying system where the meat products are rotated about a vertical axis, in which case the transport surfaces of the conveyor belts are situated at the same height, and the transport surfaces do not have to overlap one another.

Such a conveying system is for example particularly suitable for connecting a production station in which breast fillets of poultry are produced, and a processing station in which the breast fillets are subsequently cut.

In many cases, the output of such production stations is not joined to the input of such a processing station. The left-hand and right-hand breast fillets of poultry are often detached from the carcass simultaneously and passed to a conveyor belt. In the illustrated example, the breast fillets are passed to the conveyor belt in pairs, in such a manner that they extend transversely to the conveying direction.

Processing stations for cutting breast fillets are often configured so as to cut the breast fillets in the length direction, in which case the knives preferably engage with the widest part of the breast fillet.

The conveying system illustrated in FIG. 8 is configured for conveying the breast fillets from a production station to a processing station, with the breast fillets being rotated about an angle of 90 degrees. Breast fillets having a supply orientation which is such that they extend transversely to the conveying direction are rotated by the system in such a manner that the breast fillets on the discharge conveyor extend parallel to the conveying direction, preferably with the widest part leading. The breast fillets are thus passed to a processing station in an optimum position and are cut there.

In an alternative embodiment of the conveying system illustrated in FIG. 8 the transport surface begins and/or ends at an angle to the conveying direction which differs from forty-five degrees. For example, in order to rotate a meat product about an angle of 45 degrees about a vertical axis, the beginning and the end of the transport surface can extend at an angle to the conveying direction of 22.5 and 22.5 degrees or 45 and 0 degrees, respectively.

Such a conveying system can be assembled in a simple manner from a combination of two standard types of conveyor belts and a transfer conveyor belt which is adapted specifically for the desired transfer operation. The transport surface of the transfer conveyor belt is preferably defined by driven rolls, but may, for example, also be defined by a conveyor belt.

FIGS. 9a-10b show variations of the embodiment principle illustrated in FIGS. 3 and 4 in which the transport surface of the supply conveyor is positioned at such a height above the transport surface or a discharge conveyor that a supplied meat product falls from the supply conveyor down onto the discharge conveyor. In this case, the distance over which the meat product falls is such that the meat product rotates about an angle of 180 degrees about an axis transverse to the conveying direction during the fall from the supply conveyor onto the discharge conveyor.

The conveying systems 900, 910 illustrated in FIGS. 9a-10b comprise a supply conveyor 901, 911 and a discharge conveyor 902,912 for conveying meat products 904,614 in a conveying direction, indicated by an arrow 903, 913. The supply conveyor and the discharge conveyor are positioned at an angle of 90 degrees with respect to one another. The transport surface or the supply conveyor and the discharge conveyor is defined by, for example, driven rolls or a conveyor belt. The transport surface of the supply conveyor ends above the transport surface of the discharge conveyor so that a product falls from the supply conveyor onto the discharge conveyor. The supply conveyors are arranged at such a height with respect to the discharge conveyors that a supplied meat product turns over when falling from the supply conveyor onto the discharge conveyor.

Compared to the orientation of the meat products on the supply conveyor, the meat products on the discharge conveyor are not only rotated about an angle of 180 degrees about an axis transverse to the conveying direction, but also about an angle of 180 degrees about an axis at right angles to the transport surface.

By arranging the conveyor belts in this manner, a simple conveying system can be configured for tilting and rotating meat products with respect to the conveying direction using standard types of conveyor belts.

In a preferred embodiment of a meat-processing system according to the invention, a sensor and a control system for controlling the discharge speed of the discharge conveyor on the basis of the supply frequency of the breast fillets on the supply conveyor are provided. In practice, it may happen that the successive breast fillets are supplied at irregular intervals.

This may be caused, for example, by the harvesting of breast fillets. The breast fillets are detached from a carcass and subsequently fall onto the supply conveyor. Since some breast fillets come off sooner than others, the breast fillets do not land on the supply conveyor at regular intervals. However, with certain processing stations, it is preferred to deliver the breast fillets at fixed intervals and thus to supply them at a regular distance apart. By adjusting the conveying speed of the discharge conveyor or a parking belt, depending on the supply frequency of the meat products, it is possible for the meat products to be supplied at substantially regular intervals to the processing station.

In a preferred embodiment, a relatively short parking belt is provided between the relatively long supply conveyor and the relatively long discharge conveyor in order to compensate for variations in the distance between successively supplied meat products. The parking belt preferably has a length which is sufficient for supporting a single meat product, and is located downstream of the supply conveyor for receiving meat products. The discharge conveyor is arranged at the end of the parking belt, in such a manner that the meat products are transferred from the parking belt to the discharge conveyor. The supply conveyor and the discharge conveyor are moved at a constant speed and the speed of the parking belt is controlled by a control system.

Preferably, the parking belt is advanced with a fixed time interval in order to supply a meat product to the discharge conveyor. For example, when the parking belt is advanced every 2 seconds, there is an interval of 2 seconds which can be used to pass a meat product on to the discharge conveyor. A meat product is then passed on to the discharge conveyor every two seconds, so that the meat products are conveyed on the discharge conveyor at a fixed frequency.

In a further embodiment, the control system is provided with a sensor, for example a camera or weighing unit below the transport surface of the supply belt, for registering the supply frequency, and thus the mutual distance between the meat products, on the supply conveyor. In this case, the control system is configured for controlling the conveying speed, that is to say speeding up and slowing down and possibly pausing the parking belt depending on the supply frequency in order thus to reduce the difference in mutual distance between the successive meat products. In such an embodiment, the parking belt preferably has a length which is sufficient to support several meat products.

In a further embodiment, a transfer conveyor belt as shown in FIG. 8 is configured as a parking belt, that is to say that the conveying speed of the transfer conveyor belt is controlled by a control system. Thus, the orientation of the meat products with respect to the conveying direction can be changed and the mutual distance between the meat products on the discharge conveyor can also be equalized compared to the mutual distance of successive meat products on the supply conveyor.

Figure 11:
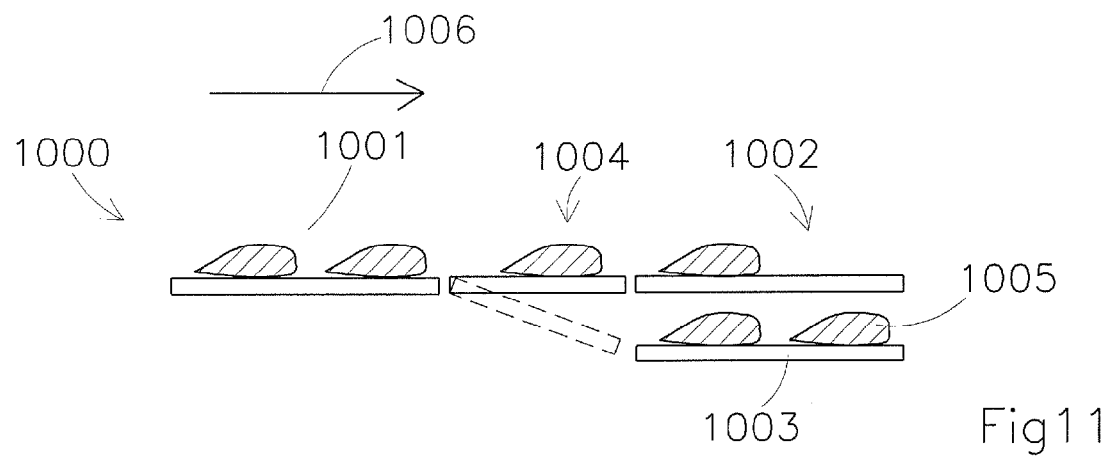
FIG. 11 shows a side view of a further alternative conveying system for a meat-processing system according to the invention.
Figure 12:
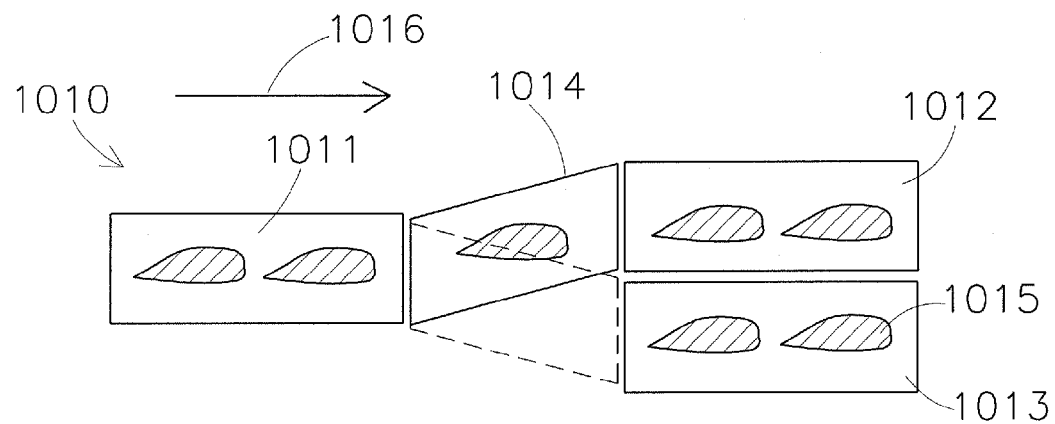
FIG. 12 shows a top view of a further alternative conveying system for a meat-processing system according to the invention.
Figure 13:
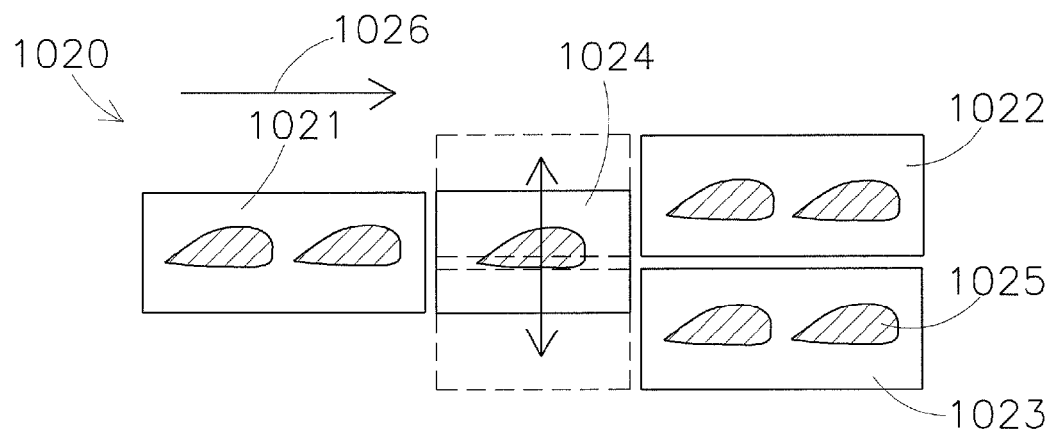
FIG. 13 shows a top view of a further alternative conveying system for a meat-processing system according to the invention.

FIGS. 11-13 show exemplary embodiments of conveying systems 1000-1020 which can be used with the meat-processing system according to the invention. The conveying systems 1000-1020 comprise a supply belt 1001, 1011, 1021 provided with a displaceable element 1004,1014,1024, and two discharge conveyors 1002,1003,1012,1013,2033,1023. The displaceable element of the supply conveyor serves as a switch which makes it possible to distribute the supplied products over two discharge conveyors. The position of the displaceable element is controlled by a control system which forms part of the meat-processing system. The products are conveyed by the conveying system in a conveying direction, indicated by an arrow 1006, 1016, 1026.

In the conveying system 1000 illustrated in side view in FIG. 11, a supply conveyor 1001 is combined with two discharge conveyors 1002, 1003. The two discharge conveyors are positioned one above the other. The supply conveyor 1001 is provided with a hinged part 1004 which is mounted such that it can hinge about a horizontal axis transverse to the conveying direction. Via the displaceable part, the supply conveyor can transfer the supplied products to the first conveyor belt 1002 or the second discharge conveyor 1003.

A conveying system as illustrated in FIGS. 11-13 is suitable for distributing a stream of products at a supply frequency Vx over two discharge conveyors having a discharge frequency of half of Vx. Thus, the conveying system can connect a high-speed production station to two low-speed processing stations.

FIGS. 12 and 13 show a top view of conveying systems 1010, 1020 which are configured to divide a single stream of products into two discharge streams. In contrast with the exemplary embodiment illustrated in FIG. 10, the discharge conveyors are situated next to one another.

The supply conveyor 1011 in FIG. 12 is provided with a displaceable part 1014 which is hingedly mounted on a shaft which is vertical with respect to the transport surface. The supply conveyor thus acts as a switch.

The supply conveyor 1021 in FIG. 13 is provided with a part 1024 which can be moved in translation in the horizontal plane. The supply conveyor thus likewise functions as a switch.

The displaceable part of the supply conveyor is controlled by a control system. In this manner, the conveying system is configured to distribute a single stream of products over two discharge conveyors.

By reversing the conveying direction in the examples illustrated in FIGS. 11-13, the illustrated principle can be used for combining a first and a second stream of products to form a single stream of products.

The above-described conveying systems can be combined with each other in meat-processing systems in order to join certain production stations whose discharge frequency and/or orientation of the products does not match that of the processing stations to one another without having to manually transfer and/or reorient the products.

In a preferred embodiment of a meat-processing system according to the invention, the conveying system is of a modular design so that the stations and the conveying system can be replaced independently of one another in order to combine a certain type of production station with different processing stations and vice versa.

For example, the different types of supply conveyors can be configured in such a manner that they can only be combined with one type of discharge conveyor. By assembling a conveying system on the basis of the one or more supply conveyors with said discharge conveyor, it is then possible to offer various solutions for connecting a production station to a processing station. For example, it is possible to choose a supply conveyor which is positioned in line with the discharge conveyor, or a supply conveyor which is positioned partly parallel to the discharge conveyor in order to turn over meat products. Depending on the desired orientation of the meat products, it is also possible to assemble a specific conveying system.

The supply conveyors may also be configured for receiving meat products from standard types of supply conveyors, and the discharge conveyors for transferring meat products to standard types of conveyor belts.

In a preferred embodiment, the meat-processing system according to the invention is provided with a production station configured for harvesting breast fillets of slaughtered poultry. In a further preferred embodiment, a meat-processing system according to the invention is provided with a production station configured for producing, substantially in parallel, a first stream of left-hand breast fillets and a second stream of right-hand breast fillets of poultry, such as chickens or turkeys. The meat-processing system is provided with a first supply conveyor for conveying the left-hand breast fillets, a second supply conveyor for conveying the right-hand breast fillets and a common discharge conveyor for conveying the left-hand and right-hand breast fillets.

The first and the second supply conveyor are configured for transferring to the common discharge conveyor and simultaneously turning over the breast fillets in a first and a second transfer location, respectively, in such a manner that the discharge conveyor supplies the breast fillets to the processing station at a discharge orientation which differs from the supply orientation which differs from the supply frequency of the respective supply conveyors.

A supply conveyor and the discharge conveyor may, for example, be configured like the exemplary embodiment illustrated in FIGS. 1 and 2. The second supply conveyor can, for example, be configured like the second supply conveyor illustrated in FIGS. 3 and 4, in which case the supply conveyor is arranged parallel to the first conveyor belt and above the first supply conveyor, in such a manner that the supplied meat products of this supply conveyor fall onto the discharge conveyor in a transfer location downstream of the transfer location in which the first supply belt transfers the meat products to the discharge conveyor.

Figure 5:
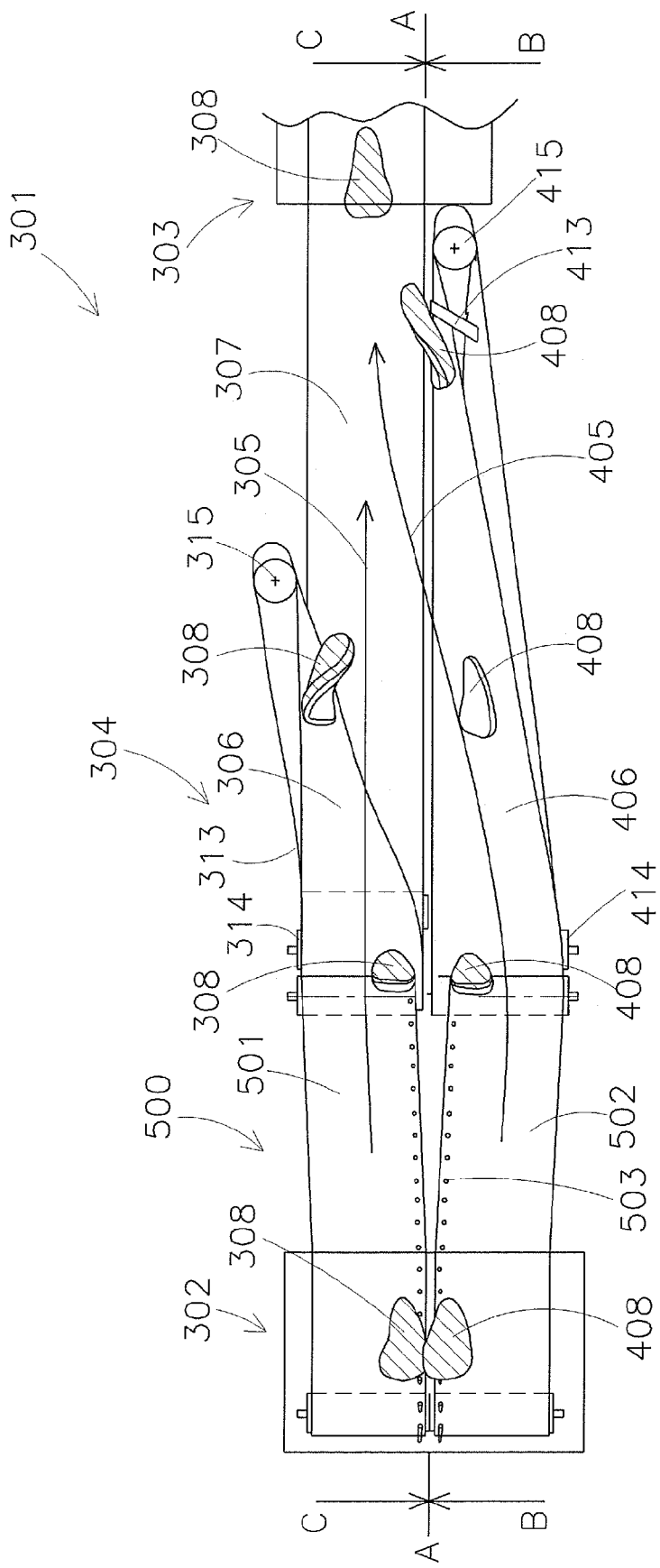
FIG. 5 shows a top view of a third meat-processing system according to the invention.

FIG. 5 shows a preferred embodiment of a meat-processing system according to the invention, comprising a system for simultaneously harvesting breast fillets. Such a system is, for example, known from NL1030671 and is commercially available under the name "FHF system".

Such a meat-processing system is configured for harvesting breast fillets of slaughtered poultry, such as chickens, turkeys, ducks, etc. In the production station, the left-hand and right-hand breast fillets are simultaneously detached from the carcass. The left-hand and right-hand breast fillets fall onto a conveyor belt in order to be transported to a processing station. Preferably, the breast fillets are cut from the carcass by means of a scraper, but they can also be torn or cut from the carcass. Both breast fillets subsequently fall down onto a conveyor belt which transports the breast fillets away for further processing, for example to a packaging station where the breast fillets are packaged individually or together with others in a tray-like container which is sealed by means of a transparent film.

Before being packaged, the breast fillets are usually also inspected for the presence of bone splinters and weighed. The inspection for bone splinters takes place in an inspection station. In the inspection station, the inner surface of the breast fillet, i.e. the surface of the breast fillet which is detached from the carcass, is subjected to a visual inspection. The inspection can be carried out by a person or, for example, by means of a camera. Those breast fillets which still contain bone splinters are removed from the product stream and processed separately.

The breast fillets which have been passed are subsequently conveyed to a weighing station where they are weighed. This information is subsequently printed on the packaging and/or used for batching the breast fillets, so that portions of breast fillets of a certain combined weight can be packaged together.

Figure 6:
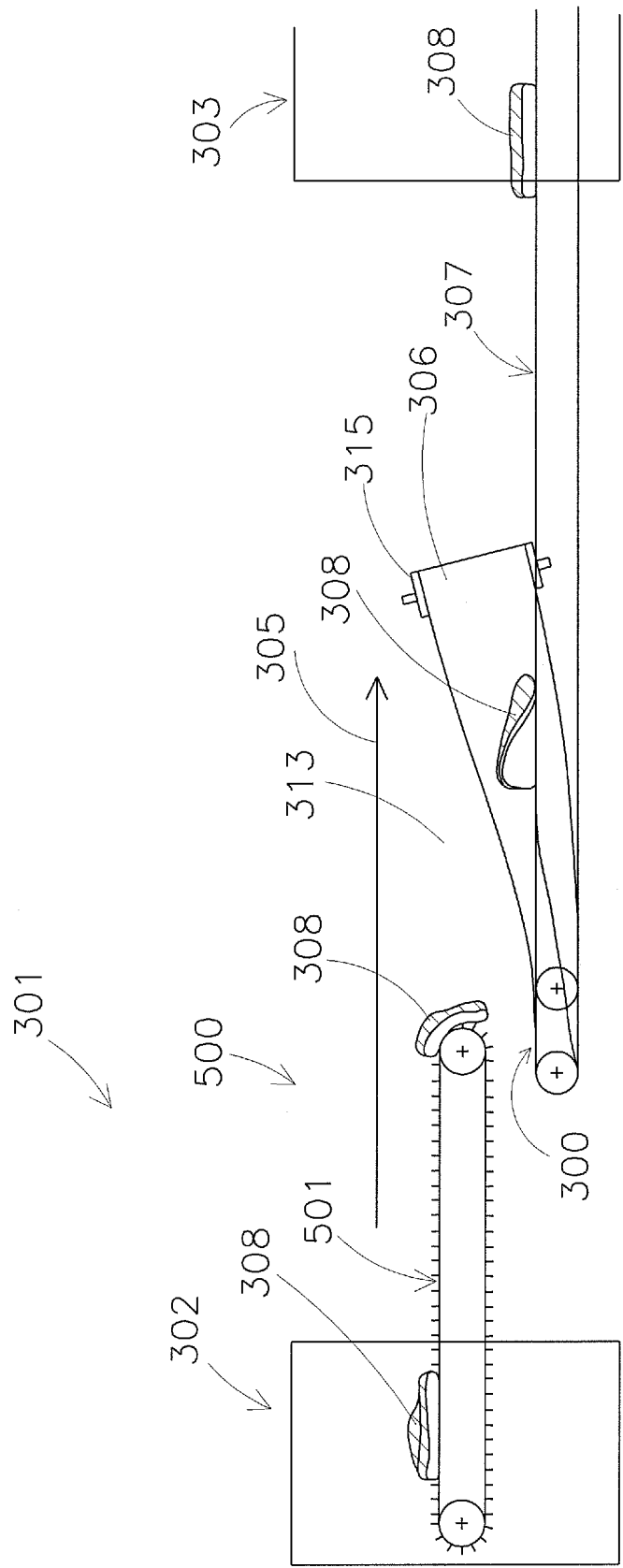
FIG. 6 shows a view in the direction of arrow B along a cross section on line AA of the meat-processing system from FIG. 5.
Figure 7:
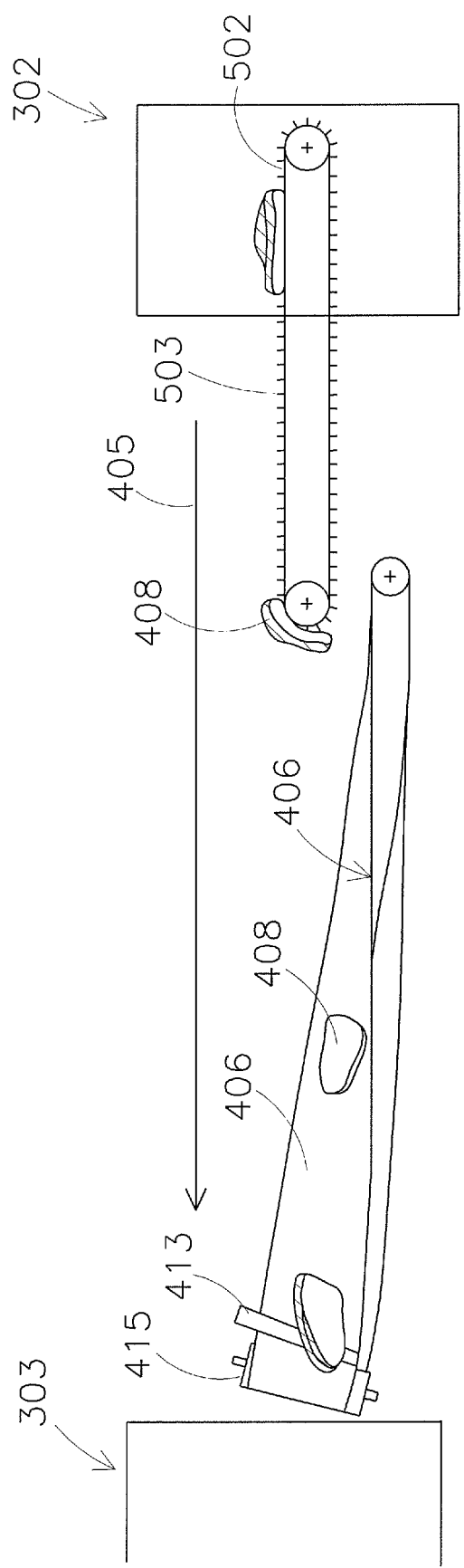
FIG. 7 shows a view in the direction of arrow C along a cross section on line AA of the meat-processing system from FIG. 5.

FIG. 5 diagrammatically shows such a meat-processing system 301 comprising a production station 302 for harvesting breast fillets 308, 408 of slaughtered poultry, in which the production station 302 is configured for substantially simultaneously producing a first stream of left-hand breast fillets 308 and a second stream of right-hand breast fillets 408. FIG. 6 shows a view in the direction of arrow B of a cross section on line AA of the meat-processing system from FIG. 5 and FIG. 7 shows a view in the direction of arrow C of a cross section on line AA.

The meat-processing system 301 comprises a conveying system 304 configured for conveying the breast fillets 308, 408 in a conveying direction 305, 405 along a conveying path from the production station 302 to a weighing station 303. The conveying system 304 comprises a splitter 500, an adjoining first supply conveyor 306 and a second supply conveyor 406, both of which adjoin a common discharge conveyor 307.

The first supply conveyor corresponds to the supply conveyor of the meat-processing system illustrated in FIGS. 1 and 2. The second supply conveyor corresponds to one of the supply conveyors of the meat-processing system illustrated in FIGS. 3 and 4.

The left-hand and right-hand breast fillets fall onto the left-hand and right-hand conveyor belts of the splitter. Downstream, the conveyor belts separate in order to thus supply the breast fillets to separate conveyor belts. The left-hand breast fillets are transferred from the splitter 500 to the first supply conveyor 307 and the right-hand breast fillets to the second supply conveyor 407. These conveyor belts extend in a first supply direction and a second supply direction, respectively, for conveying the left-hand and the right-hand breast fillets, respectively, along a supply section of the conveying path. The supply conveyors convey the breast fillets at a supply speed V1 and a supply frequency and supply orientation with respect to the conveying direction which are determined by the production station.

The common discharge conveyor 307 extends in a discharge direction for conveying the breast fillets 308, 408 supplied by the supply conveyors 306, 406 along a discharge section of the conveying path at a discharge speed V2, equal to 2× the supply speed of the separate supply conveyors.

The supply conveyors are furthermore configured for turning over the breast fillets, in which case the discharge orientation of the breast fillets with respect to the conveying direction of the discharge conveyor 307 is changed with respect to the supply orientation of the breast fillets with respect to the transport surface of the supply conveyors 306, 406.

In the meat-processing system according to the invention, the first and the second supply conveyors 306, 307 are furthermore configured for transferring the breast fillets in a first and a second transfer location, respectively, to the common discharge conveyor and simultaneously turning them over, with the discharge speed V2 of the discharge conveyor being twice the supply speed V1 of the supply conveyor. The second transfer location is located downstream of the first transfer location.

Due to the higher speed of the discharge conveyor 307 with respect to the supply conveyor 306, the mutual distance between the left-hand breast fillets 308 is greater than on the supply conveyor 306 after transferral to the discharge conveyor 307. Due to the higher conveying speed of the discharge conveyor, the left-hand breast fillets also move faster with respect to the breast fillets on the supply conveyors. This makes it possible to place the right-hand breast fillets between the left-hand breast fillets on the discharge conveyor.

The transfer location for the transfer of the right-hand breast fillets 408 to the discharge conveyor 308 is positioned such that the right-hand breast fillets are placed between the left-hand breast fillets and a single stream of alternately left-hand and right-hand breast fillets is produced. The discharge orientation of the breast fillets on the discharge conveyor differs from the supply orientation on the supply conveyor and the discharge frequency of the supply frequency of the supply conveyor.

In FIG. 5, the production station 302 is configured for producing a first stream of left-hand breast fillets 308 and a second stream of right-hand breast fillets 408. The harvested left-hand and right-hand breast fillets fall down virtually simultaneously onto a left-hand and a right-hand conveyor belt 501, 502, with the inner surface turned downwards. The breast fillets are not physically connected to one another, but fall down so close to one another that they usually partly overlap one another once they are, for example, on a conveyor belt. The breast fillets have to be separated from one another so that they can be transported and processed separately. Due to the fact that the surface of the breast fillets has a high coefficient of friction, it is not easy to separate overlapping breast fillets from one another. However, a splitter conveyor is particularly suitable for separating harvested left-hand and right-hand breast fillets.

For the sake of clarity, the side of the breast fillets which originally faced the skin has been hatched in the figures, and the inner surface along which the breast fillet has been cut loose has not been hatched. The breast fillets fall from the FHF device with the skin side turned upwards and with the inner surface turned downwards.

Since the breast fillets are harvested simultaneously, it is possible that the breast fillets are supplied by the harvesting machine such that they overlap slightly. In order to be able to process the breast fillets separately, the production station is preferably provided with a splitter conveyor belt 500 for separating the harvested breast fillets into a first stream of left-hand breast fillets 308 and a second stream of right-hand breast fillets 408. The splitter conveyor belt 500 comprises a left-hand conveyor belt 501 and a right-hand conveyor belt 502, both of which extend from a collecting area where the breast fillets fall from the harvesting machine to a transfer area where the breast fillets are transferred to the conveying system.

In the collecting area below the harvesting machine, the conveyor belts of the splitter conveyor are positioned such that the sides which face one another are placed against one another, so that there is little or no space left between the conveyor belts for collecting the left-hand and right-hand breast fillets which slightly overlap one another. The left-hand breast fillet 308 falls onto the left-hand conveyor belt 501 and the right-hand breast fillet 408 falls onto the right-hand conveyor belt 502. The breast fillets usually land in such a manner that they partly overlap one another. In order to separate the overlapping breast fillets from one another, the conveyor belts separate in the downstream direction, so that they pull the left-hand and the right-hand breast fillet apart. The left-hand conveyor belt carries along the left-hand breast fillet and the right-hand conveyor belt carries along the right-hand breast fillet, in such a manner that the two breast fillets are separated from one another. The breast fillets can now be processed separately from one another.

In the illustrated preferred embodiment, on the sides facing one another, the conveyor belts of the splitter are provided with optional pins 503 which engage with the breast fillets. The pins increase the friction between the conveyor belt and the breast fillet and thus reduce the risk of one or even both breast fillets sliding from the conveyor belts during separation and ending up between the two conveyor belts. In a further preferred embodiment, the transport surface of both conveyor belts is also provided with a structure, for example several pins which protrude with respect to the transport surface and which increase the grip on the breast fillets.

In the exemplary embodiment illustrated in FIG. 5, the left-hand and right-hand breast fillets of the conveyor belts 501, 502 of the splitter 500 are transferred to the first supply conveyor 306 and the second supply conveyor 406, respectively.

The conveyor belts of the splitter are positioned above the first and second supply conveyor so that the breast fillets fall down from the splitter. The height and the conveying speed are such that the breast fillets turn over during their fall and come to lie on the first and second supply conveyors with their inner surface turned upwards.

The breast fillets are subsequently conveyed by the first and the second supply conveyor with their inner surface turned upwards. In the area directly downstream of the transfer area, an inspection station is situated where the inner surfaces of the breast fillets are subjected to a visual inspection while they are being conveyed on the discharge conveyors. The inspection is carried out by a person (not shown) who is positioned next to the conveyor belts. If this person notices bone splinters in the cut surface, he/she takes the breast fillet from the conveyor belt and places it on an additional conveyor belt (not shown) which carries the breast fillet away for further processing.

The meat products are subsequently conveyed by the supply conveyors from the inspection station and transferred to the common discharge conveyor, in which case they are tilted about an axis parallel to the conveying direction, which conveys the meat products to the final processing station.

The meat products are thus tilted at the moment of transfer from the production station to the supply conveyors and at the moment of transfer from the supply conveyor to the discharge conveyor. Upon arrival in the processing station, the breast fillets are turned with the same side upwards as on the splitter conveyors. That part of the breast fillet which was the leading part on the splitter conveyors is the trailing part on the discharge conveyor.

In the exemplary embodiment illustrated in FIG. 5, the first supply conveyor 306 is configured for changing the orientation of the breast fillets 308 which are supplied by said supply conveyor 306 by turning over the breast fillets about an axis parallel to the conveying direction 305 in such a manner that the side of the breast fillet 308 which was turned downwards on the supply conveyor 306 is turned upwards on the discharge conveyor 307.

At the end of the supply section 310 of the conveying path, the supply conveyor 306 overlaps the discharge conveyor 307 at the start of the discharge section 311 of the conveying path, in which case the supply direction of the supply conveyor 306 is at an angle to the discharge direction of the discharge conveyor 307.

In a further advantageous embodiment, the first supply conveyor 306 is provided with an optional unloader for pushing breast fillets 308 which do not automatically slide off the supply conveyor. Such an unloader extends substantially transversely across the supply conveyor in such a manner that a breast fillet 308 which does not automatically slide off the supply conveyor is moved over the unloader. The unloader separates the breast fillet from the conveyor belt, as a result of which the breast fillet slides from the supply conveyor onto the discharge conveyor and in the process tilts about an axis parallel to the conveying direction.

The unloader is preferably a strip-shaped element, made from a readily cleanable material, such as steel or plastic, preferably having a low coefficient of friction, preferably having a coefficient of friction which is lower than the coefficient of friction of the discharge conveyor. In a further preferred embodiment, the surface of the unloader which comes into contact with the breast fillet is at an angle to the surface of the supply conveyor, so that the unloader actively guides the breast fillet away from the supply conveyor. This expedites the turning over of the meat product 308 while it is being pushed onto the discharge conveyor 307. Such an unloader is provided on the other supply conveyor 406 and is discussed below.

The first supply conveyor extends in line with the discharge conveyor 307. A part which is situated downstream thereof extends along the discharge conveyor. The part of the supply conveyor 306 which overlaps the discharge conveyor 307 makes a curve and thus forms a connection between the part of the supply conveyor 306 which extends in line with the discharge conveyor 307 and the part of the supply conveyor 306 which extends next to the discharge conveyor 307.

The first supply conveyor comprises a first return roller 314, the rotation shaft of which extends in a horizontal plane, and a second return roller 315, the rotation shaft of which extends in a substantially vertical direction.

In the exemplary embodiment illustrated in FIG. 5, the second supply conveyor 406 is configured for changing the orientation of the breast fillets 408 supplied by said supply conveyor 406 by turning over the breast fillets 408 about an axis parallel to the conveying direction 405 in such a manner that the side of the breast fillet 408 which was turned downwards on the supply conveyor 406 is turned upwards on the discharge conveyor 307.

At the end of the supply section 410 of the conveying path, the supply conveyor 406 extends along the discharge conveyor 307. At the end of the supply part of the conveying path, the surface of the supply conveyor 406 in the conveying direction 405 gradually tilts transversely to the conveying direction. The surface tilts from a substantially horizontal position for supporting a breast fillet 408 to a substantially vertical position for transferring the breast fillet 408.

The surface of the supply conveyor is adapted to the meat products in such a manner that the mutual coefficient of friction is sufficient to prevent the meat product from sliding directly off the supply conveyor. By tilting the transport surface, the force in the lateral direction, caused by the force of gravity, on the meat product gradually increases. At a certain point in time, the force is so great that the meat product laterally slides off the supply conveyor, tilts and lands upside down on the discharge conveyor. The breast fillet is thus transferred onto the discharge conveyor 307, which extends there along the supply conveyor 406, in a direction substantially transverse to the conveying direction 405.

In the illustrated advantageous exemplary embodiment, the supply conveyor 406 is provided with an optional unloader 413 which extends in a substantially vertical direction along the transport surface of the supply conveyor, at the end of the transfer location within which the breast fillet is to be transferred to the discharge conveyor. If the breast fillet does unexpectedly "stick" to the supply conveyor, the breast fillet comes into contact with the unloader 413 which separates the breast fillet from the transport surface in such a manner that it still slides off. In a preferred embodiment, the unloader is a strip-shaped element which extends across the entire width of the conveyor belt. Preferably, the contact sheet is at a slight angle to the transport surface in order to expedite tilting.

The unloader is preferably made from a material having a low coefficient of friction, for example a metal or plastic.

The supply conveyor 406 is provided with a first return roller 414, the rotation shaft of which extends in a horizontal plane, and a second return roller 415, the rotation shaft of which extends in a substantially vertical direction.

The breast fillets are thus tilted at the point in time when they are transferred from the production station to the supply conveyors and at the point in time when they are transferred from the supply conveyor to the discharge conveyor. Upon arrival in the processing station, the breast fillets are positioned with the same side turned upwards as on the splitter conveyors of the production station. The part of the breast fillet which was the leading part on the splitter conveyors is the trailing part on the discharge conveyor. Furthermore, the two streams of left-hand and right-hand breast fillets are combined to form a single stream of alternately left-hand and right-hand breast fillets. The illustrated conveying system is particularly suitable for connecting a production station for producing left-hand and right-hand breast fillets on, for example, a weighing station for weighing a single stream of breast fillets.

Providing the production station with a splitter conveyor makes it relatively easy to supply a separate first and second stream of harvested breast fillets to a production system for transportation to a processing station.

The invention also provides a method for processing meat products, in particular breast fillets of slaughtered poultry such as chickens, turkeys, ducks, etc., in which use is made of a meat-processing system according to the invention.

The method provides the conveying of meat products in a conveying direction from a production station to a processing station, in which case the orientation of the meat products is adapted with respect to the conveying direction of the stream of meat products during transportation. In this way, the stream of meat products delivered by the production station is adapted to the desired input position of the meat products for the processing station.

In particular, the invention provides a method for simultaneously harvesting left-hand and right-hand breast fillets of a slaughtered bird, conveying the left-hand and the right-hand breast fillets along a first and a second conveying path, respectively, combining said streams of left-hand breast fillets and right-hand breast fillets to form a single stream of alternately left-hand and right-hand breast fillets by means of a conveying system, and, simultaneously with the combining operation, turning over said breast fillets in such a manner that the breast fillets are positioned on the discharge conveyor with the side which was turned downwards on the supply conveyor turned upwards.

In an advantageous embodiment, the supply conveyor of a conveying system according to the invention is configured for turning the meat products by tilting the transport surface transversely to the conveying direction. Such a supply conveyor is particularly suitable for tilting flat meat products, such as breast fillets and legs which still comprise the thighbone. These meat products substantially extend in a plane. The meat products have a substantially flat bottom side and top side, and relatively narrow lateral sides. Such meat products rest on the relatively large top surface or bottom surface of the meat product.

As a rule, such flat products are packaged with a specific side turned upwards. For example, chicken legs and breast fillets are mainly packaged in tray-like containers which are sealed with a transparent film. As a result of the transparent film, the meat products are visible to the consumer. The meat products are therefore packaged in such a manner that the relatively smooth skin side is turned upwards and the relatively damaged cut side, the side which was connected to the bones of the poultry, is turned downwards.

When the meat products come out of a production station with the cut side turned upwards, they will therefore have to be turned over. In addition, it is sometimes desirable during processing of the meat products for a certain side to be turned upwards, for example during visual inspection of the inner surface or when marinating the skin side.

A conveying system which is configured for turning over the meat products during conveying makes it possible to have an efficient meat-processing system since no separate processing stations are required for manually—or by means of, for example, a robot—reorientating the meat products.

In a preferred embodiment, the conveying system according to the invention is provided with supply conveyors and discharge conveyors which form part of the production station and the processing station, respectively. In such a configuration, the distance between the production station and the processing station can remain small as the products do not have to be transferred from, for example, a conveyor belt of the production station to a supply conveyor.

In an alternative embodiment, the conveying system according to the invention is provided with supply conveyors and discharge conveyors which do not form part of the production station and the processing station, respectively. In such an embodiment, the stations are, for example, provided with a dedicated conveyor belt for transferring the meat products to the supply conveyor or for receiving the meat products from the discharge conveyor. The advantage of such an embodiment is that the conveying system can be of modular design, so that it can be adapted independently of the stations and can be combined with another product station or another processing station in a simpler manner.

It will be clear that the invention is not limited to the preferred embodiments illustrated here. Thus, various combinations of discharge conveyors and supply conveyors can be produced. In addition, the conveying system may, for example, be provided with a switch between a supply conveyor and two discharge conveyors for dividing a single stream of products into two single streams of products.

The production station of a meat-processing system according to the invention is configured for producing meat products, preferably by harvesting slaughter pieces, such as breast fillets, legs or wings, or the carcass of slaughter animals, preferably poultry, such as chickens, turkeys or ducks. The slaughter pieces are removed from the carcass in the production station and subsequently delivered to the conveying system for transportation to a processing station.

Whenever a breast fillet is mentioned in this application, this is intended to refer to the left-hand or the right-hand breast fillet which, prior to slaughtering, was attached to the left-hand or right-hand side of the carcass, respectively. It therefore does not refer to the combination of a left-hand and a right-hand breast fillet.

Conveyor belts comprise a transport surface for supporting products which are being transported. The transport surface is defined by the upper part of a conveyor belt. It will be clear that a conveyor belt can in most cases be replaced by a series of driven transport rollers without negatively impacting on the invention.

Such variants will be clear to the person skilled in the art and are deemed to be covered by the scope of the invention as defined by the following claims.

The invention claimed is:

1. A meat-processing system, comprising:
   a production station configured for substantially simultaneously producing a first stream of meat products and a second stream of meat products;
   a processing station configured for processing a single stream of meat products; and
   a conveying system configured for conveying the meat products in a conveying direction along a conveying path from the production station to the processing station, said conveying system comprising:
      a first supply conveyor extending in a supply direction for conveying the first stream of meat products along a first supply section of the conveying path at a supply frequency and a supply orientation with respect to the conveying direction which are determined by the production station, the first supply conveyor having a transport surface for supporting the meat products while conveying them;
      a second supply conveyor extending in a supply direction for conveying the second stream of meat products along a second supply section of the conveying path at a supply frequency and supply orientation with regard to the conveying direction which are determined by the production station, the second supply conveyor having a transport surface for supporting the meat products while conveying them; and
      a common discharge conveyor extending in a discharge direction for conveying the meat products supplied by the supply conveyors along a discharge section of the conveying path at a discharge orientation with respect to a conveying direction which is determined by the conveying system, and at a discharge frequency which is equal to the supply frequency of the first supply conveyor plus the supply frequency of the second supply conveyor, and is determined by the conveying system,
      wherein the common discharge conveyor has a transport surface for supporting the meat products while conveying them, said transport surface of the at least one discharge conveyor extending substantially in the horizontal direction, wherein the transport surfaces of the first and second supply conveyors in the downstream direction gradually tilt transversely to the conveying direction, from a substantially horizontal position for supporting a meat product, to a tilted position for, at a transfer location, transferring the meat products in a direction substantially transverse to the conveying direction onto the substantially horizontal transport surface of the common discharge conveyor, which, at the respective transfer locations, extends along the first supply conveyor and second supply conveyor respectively, in such a manner that during transfer from the first and second supply conveyors to the common discharge conveyor, the meat products tilt about an axis which substantially extends in the conveying direction, and the side of each of the meat products which is turned downwards on the first and second supply conveyors is turned upwards on the common discharge conveyor, and wherein the first and second supply conveyors are thus configured for, at a first and a second transfer locations, respectively, transferring the meat products to the common discharge conveyor and simultaneously turning them over, in which case the second transfer location is located downstream of the first transfer location or vice versa, and wherein the conveying system is thus configured such that the orientation of the meat products on the at least one discharge conveyor differs from the orientation of the meat products on the at least one supply conveyor.

2. The meat-processing system according to claim 1, wherein first supply conveyor partly overlaps the discharge conveyor, viewed in a vertical direction.

3. The meat-processing system according to claim 1, further comprising a transfer conveyor belt provided with a transport surface for supporting meat products, which transfer conveyor belt forms a connection between the second supply conveyor and the common discharge conveyor for transferring the meat products from the second supply conveyor to the common discharge conveyor in such a manner that, with respect to the conveying direction, the discharge orientation of the meat products differs from the supply orientation of the meat products, wherein the start of the transport surface adjoins the end of the second supply conveyor for receiving a meat product, and the end of the transport surface adjoins the start of the common discharge conveyor for dispensing the meat product, and in which the start and the end of the transport surface of the transfer conveyor belt are at an angle to the conveying direction of meat products on the transfer conveyor for conveying said meat products in a conveying direction at an angle to the conveying direction of the second supply conveyor and the conveying direction of the common discharge conveyor.

4. The meat-processing system according to claim 1, wherein the at least one supply conveyor is supported on a first rotation shaft and a second rotation shaft, the at least one discharge conveyor is supported on a third rotation shaft and a fourth rotation shaft, the first and second rotation shafts extend perpendicularly to each other, and the third and fourth rotation shafts extend horizontally in the same direction.

5. The meat-processing system according to claim 1, wherein the production station is configured for substantially simultaneously producing a first stream of left-hand breast fillets and a second stream of right-hand breast fillets of slaughtered poultry.

6. The meat-processing system according to claim 5, further comprising a splitter conveyor belt for separating harvested breast fillets into a first stream of left-hand breast fillets and a second stream of right-hand breast fillets, which splitter conveyor belt comprises a left-hand conveyor belt and a right-hand conveyor belt, both of which extend from a collecting area where the breast fillets fall from the harvesting machine to a transfer area where the breast fillets from the left-hand and right-hand conveyor belt are transferred to the first and the second supply conveyor of the conveying system, respectively, in which, in the collecting area, the sides of the left-hand and right-hand conveyor belt facing one another are placed against one another in such a manner that little or no space remains between the conveyor belts for collecting left-hand and right-hand breast fillets which slightly overlap one another, and in which the left-hand and right-hand conveyor belts diverge from one another downstream of the collecting area, with the left-hand conveyor belt carrying along the left-hand breast fillet and the right-hand conveyor belt carrying along the right-hand breast fillet, in such a manner that overlapping breast fillets are separated from one another.

7. The meat-processing system according to claim 6, wherein the conveyor belts are provided with pins extending with respect to the transport surface of the conveyor belts for engaging with the breast fillets.

8. The meat-processing system according to claim 1, wherein:

the production station is configured for harvesting breast fillets of slaughtered poultry, and is configured for substantially simultaneously producing a first stream of left-hand breast fillets and a second stream of right-hand breast fillets;

the processing station is configured for processing a single stream comprising both left-hand and right-hand breast fillets;

the conveying system is configured for conveying the breast fillets in a conveying direction along a conveying path from the production station to the processing station, said conveying system comprising:

said first supply conveyor extending in the supply direction for conveying the left-hand breast fillets along the first supply section of the conveying path at the supply frequency and supply orientation with respect to the conveying direction which are determined by the production station;

said second supply conveyor extending in the supply direction for conveying the right-hand breast fillets along the second supply section of the conveying path at the supply frequency and supply orientation with respect to the conveying direction which are determined by the production station; and said common discharge conveyor extending in the discharge direction for conveying the breast fillets supplied by the supply conveyors along the discharge section of the conveying path at the discharge speed and discharge orientation with respect to the conveying direction which differ from the supply speed and the supply orientation of the breast fillets on the supply conveyor, wherein the first and the second supply conveyors are configured for, in a first and a second transfer location, respectively, transferring the breast fillets to the common discharge conveyor and simultaneously turning them over, and in which the second transfer location is located downstream of the first transfer location, in such a manner that the discharge conveyor delivers the breast fillets to the processing station at a discharge orientation which differs from the supply orientation on a supply conveyor and a discharge frequency which differs from the supply frequency of a supply conveyor.

9. The meat-processing system according to claim 8, further comprising a splitter conveyor belt for separating harvested breast fillets into a first stream of left-hand breast fillets and a second stream of right-hand breast fillets, which splitter conveyor belt comprises a left-hand conveyor belt and a right-hand conveyor belt, both of which extend from a collecting area where the breast fillets fall from the harvesting machine to a transfer area where the breast fillets from the left-hand and right-hand conveyor belt are transferred to the first and the second supply conveyor of the conveying system, respectively, in which, in the collecting area, the sides of the left-hand and right-hand conveyor belt facing one another are placed against one another in such a manner that little or no space remains between the conveyor belts for collecting left-hand and right-hand breast fillets which slightly overlap one another, and in which the left-hand and right-hand conveyor belts diverge from one another downstream of the collecting area, with the left-hand conveyor belt carrying along the left-hand breast fillet and the right-hand conveyor belt carrying along the right-hand breast fillet, in such a manner that overlapping breast fillets are separated from one another.

10. The meat-processing system according to claim 9, wherein the conveyor belts are provided with pins which extend with respect to the transport surface of the conveyor belts for engaging with the breast fillets.

11. The meat-processing system according to claim 8, wherein the surface of the second supply conveyor in the downstream direction gradually tilts transversely to the conveying direction, from a substantially horizontal position for supporting a breast fillet to a tilted position for transferring the breast fillet in a direction substantially transverse to the conveying direction to the discharge conveyor which, at the location of the transfer location, extends along the supply conveyor in such a manner that, during transfer from the supply conveyor to the discharge conveyor, the breast fillet tilts about an axis which extends substantially in the conveying direction, and the side of the meat product which is turned downwards on the supply conveyor is turned upwards on the discharge conveyor.

12. The meat-processing system according to claim 11, further comprising a splitter conveyor belt for separating harvested breast fillets into a first stream of left-hand breast fillets and a second stream of right-hand breast fillets, which splitter conveyor belt comprises a left-hand conveyor belt and a right-hand conveyor belt, both of which extend from a collecting area where the breast fillets fall from the harvesting machine to a transfer area where the breast fillets from the left-hand and right-hand conveyor belt are transferred to the first and the second supply conveyor of the conveying system, respectively, in which, in the collecting area, the sides of the left-hand and right-hand conveyor belt facing one another are placed against one another in such a manner that little or no space remains between the conveyor belts for collecting left-hand and right-hand breast fillets which slightly overlap one another, and in which the left-hand and right-hand conveyor belts diverge from one another downstream of the collecting area, with the left-hand conveyor belt carrying along the left-hand breast fillet and the right-hand conveyor belt carrying along the right-hand breast fillet, in such a manner that overlapping breast fillets are separated from one another.

13. The meat-processing system according to claim 12, wherein the conveyor belts are provided with pins which extend with respect to the transport surface of the conveyor belts for engaging with the breast fillets.

14. The meat-processing system according to claim 11, wherein the first supply conveyor, the transport surface of which gradually tilts in the conveying direction, partly overlaps the discharge conveyor, viewed in the vertical direction.

15. The meat-processing system according to claim 14, further comprising a splitter conveyor belt for separating harvested breast fillets into a first stream of left-hand breast fillets and a second stream of right-hand breast fillets, which splitter conveyor belt comprises a left-hand conveyor belt and a right-hand conveyor belt, both of which extend from a collecting area where the breast fillets fall from the harvesting machine to a transfer area where the breast fillets from the left-hand and right-hand conveyor belt are transferred to the first and the second supply conveyor of the conveying system, respectively, in which, in the collecting area, the sides of the left-hand and right-hand conveyor belt facing one another are placed against one another in such a manner that little or no space remains between the conveyor belts for collecting left-hand and right-hand breast fillets which slightly overlap one another, and in which the left-hand and right-hand conveyor belts diverge from one another downstream of the collecting area, with the left-hand conveyor belt carrying along the left-hand breast fillet and the right-hand conveyor belt carrying along the right-hand breast fillet, in such a manner that overlapping breast fillets are separated from one another.

16. The meat-processing system according to claim 15, wherein the conveyor belts are provided with pins which extend with respect to the transport surface of the conveyor belts for engaging with the breast fillets.

17. The meat-processing system according to claim 1, wherein the conveying system is of a modular design so that the stations and the conveying system can be replaced independently of one another in order to combine a certain type of production station with different processing stations and vice versa.

18. A method for processing meat products, comprising the step of using a meat-processing system, the meat-processing system comprising:
 a production station configured for substantially simultaneously producing a first stream of meat products and a second stream of meat products;
 a processing station configured for processing a single stream of meat products; and
 a conveying system configured for conveying the meat products in a conveying direction along a conveying path from the production station to the processing station, said conveying system comprising:
  a first supply conveyor extending in a supply direction for conveying the first stream of meat products along a first supply section of the conveying path at a supply frequency and a supply orientation with respect to the conveying direction which are determined by the production station, the first supply conveyor having a transport surface for supporting the meat products while conveying them;
  a second supply conveyor extending in a supply direction for conveying the second stream of meat products along a second supply section of the conveying path at a supply frequency and supply orientation with regard to the conveying direction which are determined by the production station, the second supply conveyor having a transport surface for supporting the meat products while conveying them; and a common discharge conveyor extending in a discharge direction for conveying the meat products supplied by the supply conveyors along a discharge section of the conveying path at a discharge orientation with respect to a conveying direction which is determined by the conveying system, and at a discharge frequency which is equal to the supply frequency of the first supply conveyor plus the supply frequency of the second supply conveyor, and is determined by the conveying system,
wherein the common discharge conveyor has a transport surface for supporting the meat products while conveying them, said transport surface of the at least one discharge conveyor extending substantially in the horizontal direction,
wherein the transport surfaces of the first and second supply conveyors in the downstream direction gradually tilt transversely to the conveying direction, from a substantially horizontal position for supporting a meat product, to a tilted position for, at a transfer location, transferring the meat products in a direction substantially transverse to the conveying direction onto the substantially horizontal transport surface of the common discharge conveyor, which, at the respective transfer locations, extends along the first supply conveyor and second supply conveyor respectively, in such a manner that during transfer from the first and second supply conveyors to the common discharge conveyor, the meat products tilt about an axis which substantially extends in the conveying direction, and the side of each of the meat products which is turned downwards on the first and second supply conveyors is turned upwards on the common discharge conveyor, and
wherein the first and second supply conveyors are thus configured for, at a first and a second transfer locations, respectively, transferring the meat products to the common discharge conveyor and simultaneously turning them over, in which case the second transfer location is located downstream of the first transfer location or vice versa, and
wherein the conveying system is thus configured such that the orientation of the meat products on the at least one discharge conveyor differs from the orientation of the meat products on the at least one supply conveyor.

\* \* \* \* \*